(12) United States Patent
Knox

(10) Patent No.: US 7,567,296 B2
(45) Date of Patent: Jul. 28, 2009

(54) METHOD AND SYSTEM FOR DETECTING AND PERFORMING AUTOMATIC BANK SWITCHING FOR A FILTER COEFFICIENT RAM

(75) Inventor: Michael Dwayne Knox, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 687 days.

(21) Appl. No.: 10/519,028

(22) PCT Filed: Jun. 26, 2003

(86) PCT No.: PCT/US03/19940

§ 371 (c)(1),
(2), (4) Date: Dec. 22, 2004

(87) PCT Pub. No.: WO2004/004318

PCT Pub. Date: Jan. 8, 2004

(65) Prior Publication Data

US 2005/0237430 A1 Oct. 27, 2005

Related U.S. Application Data

(60) Provisional application No. 60/392,293, filed on Jun. 27, 2002.

(51) Int. Cl.
*H04N 3/27* (2006.01)
*H04N 9/64* (2006.01)

(52) U.S. Cl. .......................... 348/554; 348/714; 348/705

(58) Field of Classification Search ................. 348/554, 348/555, 714, 715, 718, 719, 705, 706, 478; H04N 3/27, H04N 5/46, 9/64, 5/268, 7/00
See application file for complete search history.

(56) References Cited

U.S. PATENT DOCUMENTS

| 5,883,676 A * | 3/1999 | Miyazaki et al. ............ 348/567 |
| 6,313,882 B1 | 11/2001 | Limberg et al. |
| 6,404,458 B1 * | 6/2002 | Kang .......................... 348/556 |
| 6,411,253 B1 | 6/2002 | Cox et al. |
| 6,411,334 B1 | 6/2002 | Yeh et al. |
| 6,975,323 B1 * | 12/2005 | Yamamoto .................. 348/714 |

FOREIGN PATENT DOCUMENTS

EP 0444368 9/1991

OTHER PUBLICATIONS

Search Report dated Oct. 8, 2003.

* cited by examiner

*Primary Examiner*—Sherrie Hsia
(74) *Attorney, Agent, or Firm*—Robert D. Shedd; Joseph J. Opalach; Brian J. Cromarty

(57) ABSTRACT

A method for facilitating a dual-bank filter coefficient RAM designed to switch banks automatically during the vertical blanking interval in a television application. The method and system of the present invention allows a micro controller to program a new set of filter coefficients in the memory bank not currently being used, automatically detect when all the coefficients have been written and then automatically switch banks during the vertical blanking interval in the television application.

16 Claims, 4 Drawing Sheets

METHOD AND SYSTEM FOR DETECTING AND PERFORMING AUTOMATIC BANK SWITCHING FOR A FILTER COEFFICIENT RAM

PRIORITY CLAIM

This application claims the benefit, under 35 U.S.C. § 365 of International Application PCT/US03/19940, filed Jun. 26, 2003, which was published in accordance with PCT Article 21(2) on Jan. 8, 2004 in English and which claims the benefit of U.S. provisional patent application No. 60/392,293, filed Jun. 27, 2002.

FIELD OF THE INVENTION

The present invention relates to data transfer and storage in a video processing system.

BACKGROUND OF THE INVENTION

With the advent of digital and high definition television broadcasting modern television signal processing systems are required to receive and display multiple formats of television broadcasts. Each format has unique signal qualities and is optimally processed by unique filter configurations. It is desirable for the program broadcaster to be able to switch between formats during the course of the broadcast. It is therefore necessary for the television signal processing system to be able recognize a change in broadcast format and change the filter configuration to optimally process the new format.

Changing the filter configuration during a broadcast can result in undesirable disturbances in the picture, such as video flashes, pairing in interlaced signals, loss of picture synchronization, or audio disturbances. It is advantageous to eliminate these undesirable disturbances and perform the switch in program formats smoothly so the viewer is unaware of any change.

SUMMARY OF THE INVENTION

In one aspect, the present invention involves a method for managing memory in a video signal processing device comprising disabling a first memory and a second memory, switching an output from the first memory to the second memory in response to a portion of a video signal, and enabling the first memory and the second memory.

In another aspect, the invention also involves an apparatus for selecting one of a plurality of video filter coefficients comprising a first memory for storing a first set of video filter coefficients, a second memory for storing a second set of video filter coefficients, a switch for selecting either the first memory or the second memory, and a bank switching device for detecting a portion of a video signal and changing the state of the switch.

DETAILED DESCRIPTION OF THE PREFERRED EMBODIMENT

The characteristics and advantages of the present invention will become more apparent from the following description, given by way of example. One embodiment of the present invention may be included within an integrated circuit. Another embodiment of the present invention may comprises discrete elements forming a circuit.

Figure 1:
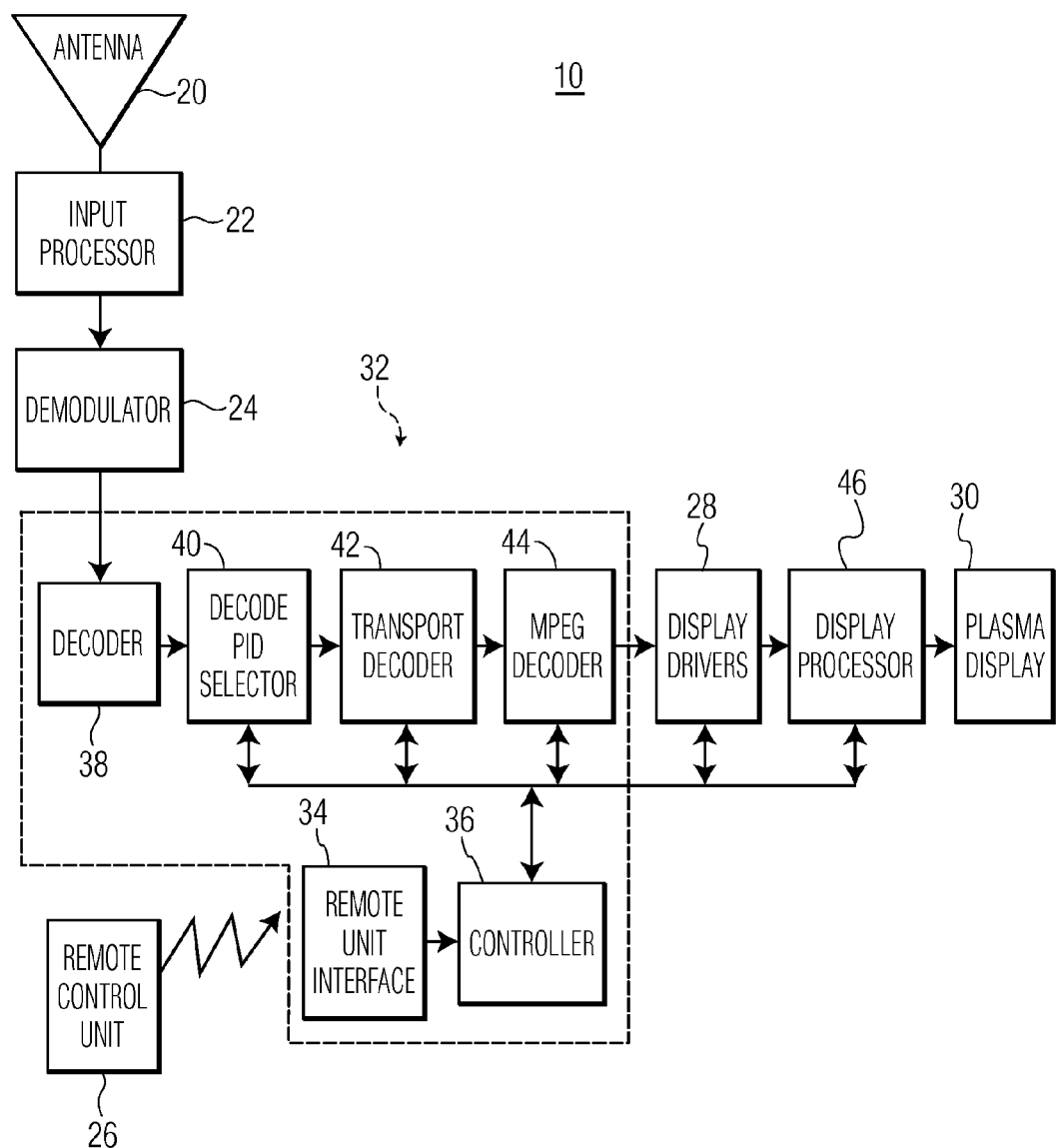
FIG. 1 is a block diagram of a multiformat television signal processing systems.

FIG. 1 is a block diagram of an exemplary digital video receiving system (10) according to the present invention. System (10) includes an antenna (20) and an input processor (22) for together receiving and digitizing a broadcast carrier modulated with signals carrying audio, video, and associated data. System (10) also includes a demodulator (24) for receiving and demodulating the digital output from input processor (22). Further, system (10) includes a remote control unit (26) for receiving user input commands. System (10) also includes one or more digital-input-to-digital-output or digital-input-to-analog-output display driver(s) (28) and a respective digital-input or analog-input display (30) for together converting digital video picture data into visual representations. In the preferred embodiment, display (30) is a multiformat television display unit and, accordingly, display driver(s) (28) is a suitable multiformat-input-to-digital-output device. While the present invention is described in regard to the exemplary embodiment of FIG. 1 which includes a display device, the invention is also applicable to systems that do not include a display device such as set top boxes, video cassette recorders, and DVD players.

System (10) further includes a video processor (32). In general, video processor (32) receives user input commands from remote control unit (26), receives the demodulated data from demodulator (24), and transforms the demodulated data into video picture data for display driver(s) (28) in accordance with the user input commands. Accordingly, video processor (32) includes a remote interface (34) and a controller (36). Remote interface (34) receives user input commands from remote control unit (26). Controller (36) interprets the input commands and appropriately controls settings for various components of processor (32) to carry out the commands (e.g., channel and/or on-screen display ("OSD") selections). Video processor (32) further includes a decoder (38) for receiving the demodulated data from demodulator (24) and outputting a digital signal that is trellis decoded, mapped into byte length data segments, de-interleaved, and Reed-Solomon error corrected. The corrected output data from decoder (38) is in the form of a Moving Picture Experts Group ("MPEG") standard compatible transport data stream containing program representative multiplexed audio, video, and data components.

Processor (32) further includes a decode packet identifier ("PID") selector (40) and a transport decoder (42). PID selector (40) identifies and routes selected packets in the transport stream from decoder (38) to transport decoder (42). Transport decoder (42) digitally demultiplexes the selected packets into audio data, video data, and other data for further processing by processor (32) as discussed in further detail below.

The transport stream provided to processor (32) comprises data packets containing program channel data, ancillary system timing information, and program specific information such as program content rating and program guide information. Using the program specific information, transport decoder (42) identifies and assembles individual data packets including the user selected program channel. Transport decoder (42) directs the ancillary information packets to controller (36) which parses, collates, and assembles the ancillary information into hierarchically arranged tables.

The system timing information contains a time reference indicator and associated correction data (e.g., a daylight savings time indicator and offset information adjusting for time drift, leap years, etc.). This timing information is sufficient for an internal decoder (e.g., MPEG decoder (44), discussed below) to convert the time reference indicator to a time clock (e.g., United States eastern standard time and date) for establishing a time of day and date of the future transmission of a program by the broadcaster of the program. The time clock is useable for initiating scheduled program processing functions such as program play, program recording, and program playback.

Meanwhile, the program specific information contains conditional access, network information, and identification and linking data enabling system (10) to tune to a desired channel and assemble data packets to form complete programs. The program specific information also contains ancillary program content rating information (e.g., an age based suitability rating), program guide information (e.g., an Electronic Program Guide ("EPG")) and descriptive text related to the broadcast programs as well as data supporting the identification and assembly of this ancillary information.

System (10) also includes an MPEG decoder (44). Transport decoder (42) provides MPEG compatible video, audio, and sub-picture streams to MPEG decoder (44). The video and audio streams contain compressed video and audio data representing the selected channel program content. The sub-picture data contains information associated with the channel program content such as rating information, program description information, and the like. MPEG decoder (44) decodes and decompresses the MPEG compatible packetized audio and video data from transport decoder (42) and derives decompressed program representative data therefrom.

MPEG decoder (44) also assembles, collates and interprets the sub-picture data from transport decoder (42) to produce formatted program guide data for output to an internal OSD module (not shown). The OSD module processes the sub-picture data and other information to generate pixel mapped data representing subtitling, control, and information menu displays including selectable menu options and other items for presentation on display (30). The control and information displays, including text and graphics produced by the OSD module, are generated in the form of overlay pixel map data under direction of controller (36). The overlay pixel map data from the OSD module is combined and synchronized with pixel representative data from decoder (38) under the direction of controller (36). Combined pixel map data representing a video program on the selected channel together with associated sub-picture data is encoded by MPEG decoder (44).

System (10) further includes one or more display processor(s) (46). In general, display processor(s) transform the encoded program and sub-picture data from MPEG decoder (44) into a form compatible with display driver(s) (28). In the exemplary embodiment, display processor(s) (46) include a video format converter ("VFC") (60) (see FIG. 2) according to the present invention as discussed further below.

Figure 2:
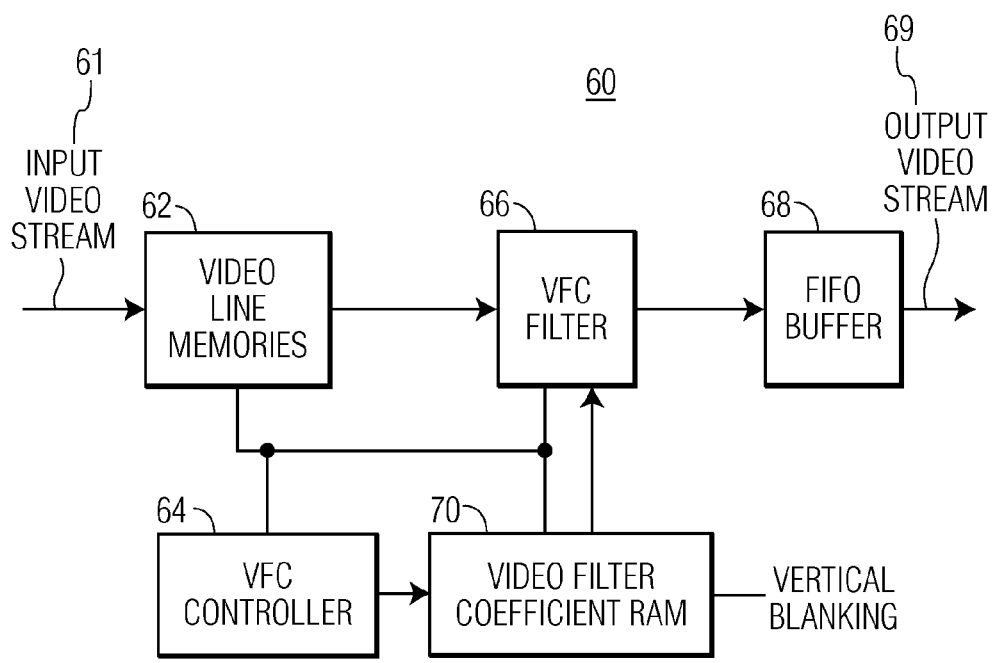
FIG. 2 is a block diagram of an exemplary implementation of a video format converter in a digital video receiving system.

FIG. 2 is a block diagram of an exemplary implementation of a video format converter ("VFC") (60) in a digital video receiving system according to the present invention. The VFC (60) includes a plurality of parallel video line memories (62), a VFC controller (64), a VFC filter (66), a filter coefficient RAM (70), and a first-in first-out ("FIFO") data buffer 68. The VFC (60) receives an input video stream (61) from the MPEG decoder (44) and transmits an output video stream (69) to the display processors (46). In general, VFC controller 64 controls video line memories (62) and the VFC filter (66) to store or queue data from an incoming video stream (61). Further, the video filter coefficient RAM (70) is configured to operate in response to the VFC controller (64) to make the optimal set of video filter coefficients available to the VFC filter (66) for the display format being processed by the display processor (46).

A change in the display format of the incoming video stream requires a change in the video filter coefficients being used by the VFC filter (66) to produce the best possible picture. However, changing the video filter coefficients may result in undesirable disturbances in the output video stream, and subsequently the picture, such as video flashes, pairing in interlaced signals, loss of picture synchronization, or audio disturbances. It is advantageous to eliminate these undesirable disturbances and perform the switch in program formats smoothly so the viewer is unaware of any change. When the VFC controller (64) determines that a change in display format of the incoming video stream has occurred, the VFC controller (64) transmits the addresses of the video filter coefficients for the new display format to the video filter coefficient RAM (70). After receiving the complete set of addresses for the video filter coefficients of the new display format from the VFC controller (64), the filter coefficient RAM (70) then makes a transition between the video filter coefficient sets of the previous display format and the new display format during a subsequent vertical blanking interval.

A television video signal includes video intervals alternating with blanking intervals where the video is interrupted so that display (30) scan beam can be quickly returned to a point where a subsequent scan is commenced. There are two types of blanking intervals, the horizontal blanking interval which occurs once for each line of the video image and which contains a single horizontal sync pulse, and the vertical blanking interval which occurs after each field of video information. The vertical blanking interval generally includes six relatively wide vertical synchronization pulses preceded by six relatively narrow pre-equalization pulses and followed by six relatively narrow post-equalization pulses. After the filter coefficient RAM (70) senses the vertical synchronization pulses, it initiates the transition between the video filter coefficient sets of the previous display format and the new display format. Since the transition is made during a vertical blanking interval, when there is no video output, the transition is in a manner to prevent undesirable disturbances in the picture.

Figure 3:
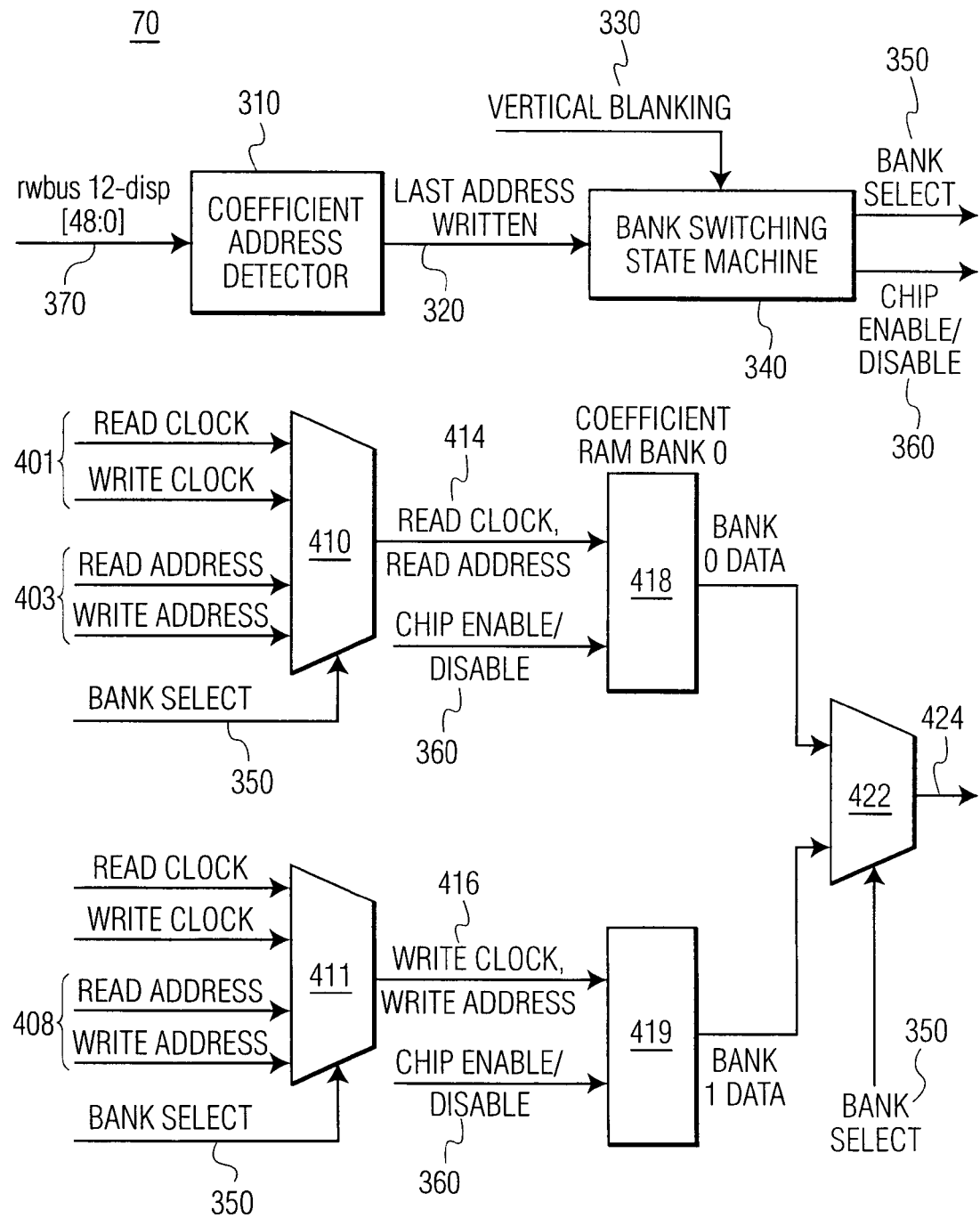
FIG. 3 is a block diagram of an exemplary implementation of memory bank switching circuitry.

FIG. 3 is a block diagram of an exemplary embodiment of the filter coefficient RAM (70) including an apparatus to control the switching of memory banks storing video filter coefficients. The system shown in FIG. 3 includes a register bus (370), coefficient address detector (310), a bank switching state machine (340), a first input multiplexer (410) and second input multiplexer (411), a first RAM (418) and a second RAM (419) and an output multiplexer (422). A portion of the register bus (370) includes an address bus (403, 408). The register bus (370) can be accessed by the VFC Controller (64, FIG. 2), the coefficient address detector (310), the VFC filter (66, FIG. 2), the first input multiplexer (410) and the second input multiplexer (411) and is used to read and write the banks of filter coefficients that are used by the VFC filter (66, FIG. 2).

The VFC controller (64, FIG. 2) writes the addresses to the RAM (418, 419) selected at that time to be in the write mode. This selection is made via the bank select line (350) from the bank switching state machine (340). It should be noted that only one input multiplexer (410,411) can be configured to be in the write mode at any one time as the other input multiplexer (410,411) operates on the inverse of the bank select line (350). Therefore when the bank select line is high, for example, the first input multiplexer (410) is in the write mode, while the second input multiplexer (411) other is in the read mode. When the state of the bank select line (350) changes state, the function of each input multiplexer (410,411) changes in response, thus the first input multiplexer (410) is in the read mode while the second input multiplexer (411) is in the write mode. Therefore, only one RAM (418,419) can be written to at one time and only one RAM (418,419) can be read from at any one time, dependant on the state of the bank select line (350).

The VFC filter (66, FIG. 2) requests the address of the video filter coefficients currently required from the RAM (418,419) via the read address line (403,408) of the input multiplexer (410,411) currently in the read mode. The requested address information is then read via the bank data line (424) connected to the VFC filter (66, FIG. 2).

The address detector (310) monitors the data on the register bus (370) to determine the status of writing addresses to the RAMs by the VFC controller (64, FIG. 2). When the address detector (310) detects addresses of filter coefficients being written a RAM (418,419), which indicates a change in the format of the incoming video stream (61, FIG. 2), the address detector (310) determines when the last address of the filter coefficient has been written, either by counting the number of addresses written and comparing that number against a known quantity or by an alternate method, and then sets the last_addr_written flag to the bank switching circuitry (340). The last_addr_written flag is set by changing the state of the last flag written line (320) connecting the coefficient address detector (310) and the bank switching circuitry (340). After observing the "last_addr_written" flag, the bank switching circuitry (340) monitors the vertical blanking line (330) for the next vertical blanking interval, which is indicated by a vertical sync pulse associated with the input video stream as described previously.

After the vertical blanking interval is indicated, the bank switching circuitry, (340) disables the RAMS (418,419) via the chip enable/disable line (360) to prevent false reads or writes from occurring. A false read or write may occur when information is being read from the RAM (418,419) and written to the RAM (418, 419) at the same time. In this instance, the VFC filter (66, FIG. 2) may erroneously read video filter coefficients from both the new set of video filter coefficients being written and the set being written over, thereby resulting in an incorrect set of video filter coefficients. Additionally, similar errors may also occur with a single address being read and written at the same time. After the RAMS (418,419) are disabled, the bank switching circuitry (340) switches the RAM (418,419) to be read via the bank select line (350) as described previously. The bank select line (350) concurrently is used to switch the state of the input multiplexers. (410,411) Switching the state of the input multiplexers. (410,411) connects the read clock (401) and read address (403) lines to the RAM (418,419) previously set to write and connects the write clock and write address lines (416) the RAM (418,419) previously set to read. The input multiplexers are connected to the RAMS (418,419) via conductive lines. (414, 416) After the bank switching circuitry (340) changes the state of the bank select line (350) it enables the RAMS (418,419) via the chip enable/disable line. (360) At this time, the video filter coefficients for the new video format are able to be read by the VFC filter (66, FIG. 2) via the bank data line (424) and the output multiplexer (422).

Figure 4:
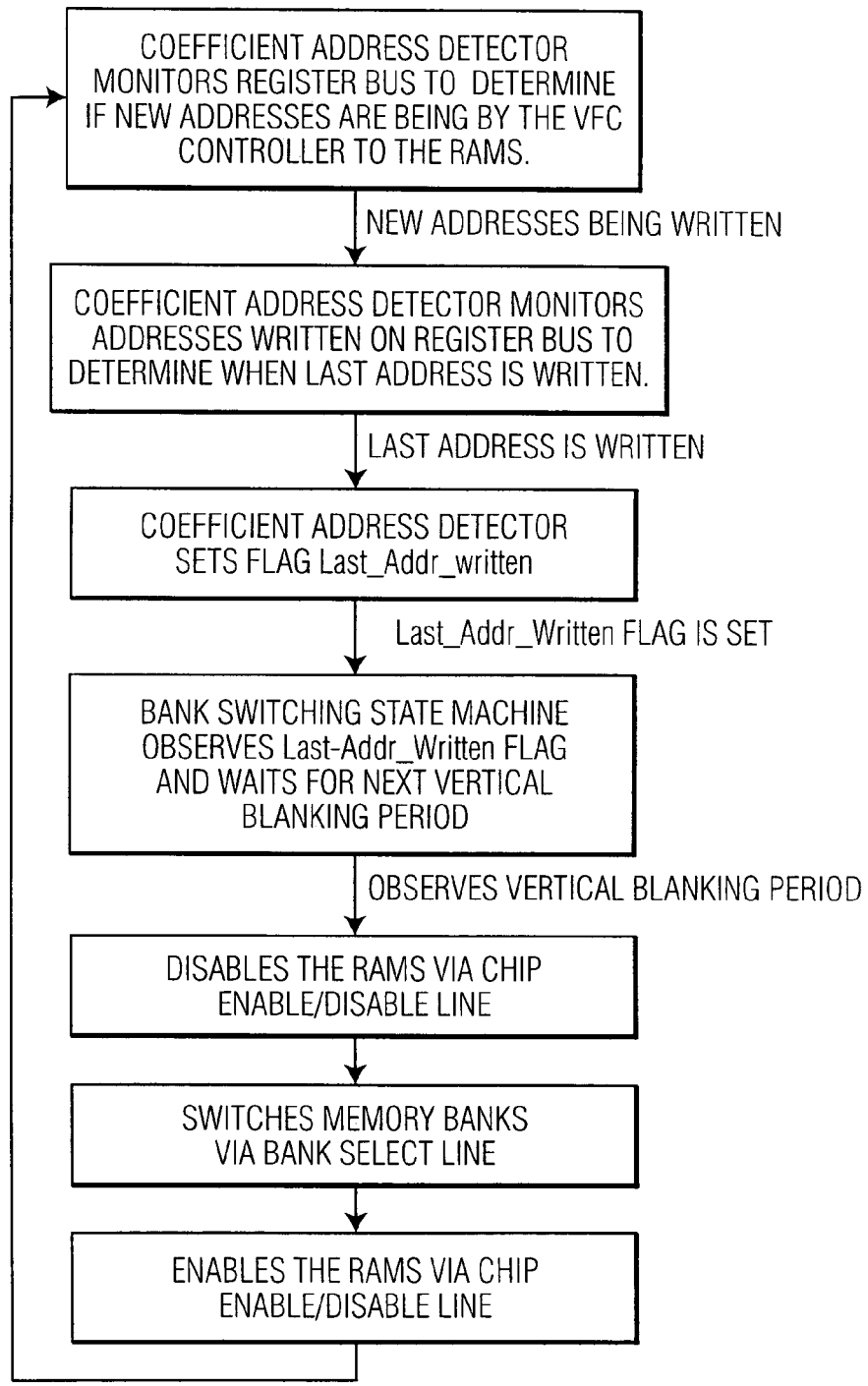
FIG. 4 is a flowchart that illustrates the process of detecting a program format change, the process of detecting a vertical blanking interval and the process of switching the video filter coefficients.

FIG. 4 is a flowchart illustrating the process of detecting a program format change, the process of detecting a vertical blanking interval and the process of switching the video filter coefficients according to the following exemplary memory management technique of the present invention:

1. The coefficient address detector (310) monitors the register bus to determine if new addresses are being written by the VFC controller (64) to the RAMs (418,419).
2. After the coefficient address detector (310) determines new addresses are being written, indicating a change in the input video format, the coefficient address detector (310) monitors the addresses being written to determine when the last address has been written.
3. After the last address has been written by the VFC controller, the coefficient address detector (310) sets the last_addr_written flag (320).
4. When the bank switching state machine (340) observes the last_addr_written flag, it monitors the vertical blanking line (330) to determine the start of the next vertical blanking period.
5. After the next vertical blanking period is indicated via the vertical blanking line (330), the bank switching state machine (340) disables the RAMs (418,419) via the chip enabled/disabled (360).
6. The bank switching state machine (340) then switches the read/write functions of the RAMs (418,419) via the bank select line (350).
7. The bank switching state machine (340) then enables the RAMs (418,419) via the chip enabled/disabled (360).
8. The address detector then returns to the initial state of monitoring the register bus to determine if new addresses are being written by the VFC controller (64) to the RAMs (418,419).

While the present invention has been described with reference to the preferred embodiments, it is apparent that various changes may be made in the embodiments without departing from the spirit and the scope of the invention, as defined by the appended claims.

The invention claimed is:

1. A method for managing memory in a video signal processing device comprising:
    processing a video signal using a first bank of video filter coefficients;
    detecting a change in a video display format of said video signal;
    writing video filter coefficient data corresponding to a second bank of video filter coefficients to a second memory in response to said change in said video display format;
    disabling said first memory and said second memory;
    switching an output from said first memory to said second memory in response to said writing step and a video blanking interval;
    enabling said first memory and said second memory; and
    processing said video signal using said second bank of video filter coefficients.

2. The method for managing memory of claim 1, wherein said video blanking interval is a vertical video blanking interval.

3. The method for managing memory of claim 1 wherein said output is connected to a video filter.

4. The method for managing memory of claim 3 wherein said first memory and said second memory store video filter coefficient data.

5. The method for managing memory of claim 4 wherein said video filter coefficient data is the memory address data of video filler coefficients.

6. The method for managing memory of claim 1 wherein disabling said first memory and said second memory comprises the steps of disabling the read and write functions of said first memory and said second memory.

7. A method for changing video filter coefficients in a video signal processing device comprising:
 detecting a change in a video display format of a video signal;
 writing at least one address of a bank of video filter coefficients to a first memory;
 disabling said first memory;
 switching an output of a second memory to said first memory in response to a video blanking interval; and
 enabling said first memory.

8. The method for changing video filter coefficients in a video signal processing device of claim 7, wherein said video blanking interval is a vertical video blanking interval.

9. The method for changing video filter coefficients in a video signal processing device of claim 7 wherein said output is connected to a video filter.

10. The method for changing video filter coefficients in a video signal processing device of claim 9, wherein said first memory and said second memory store video filter coefficient data.

11. An apparatus for selecting one of a plurality of video filter coefficients comprising:
 a first memory for storing a first set of video filter data corresponding to a first bank of video filter coefficients;
 a second memory for storing a second set of video filter data corresponding to a second bank of coefficients;
 a processor for processing a video signal using said first set of video filter data, said processor further operative to detect a video display format of said video signal, for writing video filter data to said second memory in response to said change in said video display format, and for processing said video signal using said second set of video filter data;
 a switch for selecting either said first memory or said second memory and coupling said selected memory to said processor; and
 a bank switching device for detecting said processor writing video filter coefficient data, detecting a video blanking interval of said video signal and changing the state of said switch in response to detecting said writing of video coefficient data followed by said detecting of said video blanking interval.

12. The apparatus of claim 11, wherein said video blanking interval is a vertical video blanking interval.

13. The apparatus of claim 11 wherein said first set of video filter data and said second set of video filter data are a plurality of memory address locations of video filter coefficients.

14. The apparatus of claim 11 wherein said first set of video filter data and said second set of video filter data are a plurality of video filter coefficients.

15. The apparatus of claim 11 wherein said switch is a multiplexer.

16. The apparatus of claim 11 wherein said apparatus is included within art integrated circuit.

\* \* \* \* \*